(12) United States Patent
Spertus et al.

(10) Patent No.: US 7,827,154 B1
(45) Date of Patent: Nov. 2, 2010

(54) APPLICATION FAILURE DIAGNOSIS

(75) Inventors: Michael P. Spertus, Chicago, IL (US);
David A. Stuckmann, Cary, IL (US);
Richard Schooler, Seattle, WA (US);
Christopher D. Metcalf, Wellesley, MA (US)

(73) Assignee: Symantec Operating Corporation, Mountain View, CA (US)

( * ) Notice: Subject to any disclaimer, the term of this patent is extended or adjusted under 35 U.S.C. 154(b) by 997 days.

(21) Appl. No.: 10/958,746

(22) Filed: Oct. 5, 2004

(51) Int. Cl.
*G06F 7/00* (2006.01)

(52) U.S. Cl. .................................................... 707/689

(58) Field of Classification Search ................ 395/500; 709/331; 713/191; 707/202, 689
See application file for complete search history.

(56) References Cited

U.S. PATENT DOCUMENTS

| | | | |
|---|---|---|---|
| 5,499,357 A * | 3/1996 | Sonty et al. ................. | 710/104 |
| 6,141,698 A * | 10/2000 | Krishnan et al. ............. | 719/331 |
| 6,256,773 B1 * | 7/2001 | Bowman-Amuah ......... | 717/121 |
| 6,360,331 B2 * | 3/2002 | Vert et al. .................... | 714/4 |
| 6,651,183 B1 * | 11/2003 | Gensler et al. ............... | 714/4 |
| 6,675,295 B1 * | 1/2004 | Marcelais et al. ............ | 713/2 |
| 6,742,141 B1 | 5/2004 | Miller | |
| 6,757,837 B1 * | 6/2004 | Platt et al. .................... | 714/4 |
| 6,801,940 B1 | 10/2004 | Moran et al. | |
| 6,880,086 B2 * | 4/2005 | Kidder et al. ................ | 713/191 |
| 6,920,502 B2 | 7/2005 | Araujo et al. | |
| 2003/0014744 A1 * | 1/2003 | Doll et al. .................... | 717/170 |
| 2004/0015953 A1 * | 1/2004 | Vincent ........................ | 717/173 |
| 2004/0019878 A1 * | 1/2004 | Kotnur et al. ................ | 717/120 |

OTHER PUBLICATIONS

Dart, Susan, "Concepts in Configuration Management Systems," 1991, ACM, pp. 1-18.*
Deutsch, Alin et al., "A Query Language for XML", 1999, Computer Networks, pp. 1-19.*

* cited by examiner

*Primary Examiner*—John R. Cottingham
*Assistant Examiner*—Mohammed R Uddin
(74) *Attorney, Agent, or Firm*—Rory D. Rankin; Meyertons, Hood, Kivlin, Kowert & Goetzel, P.C.

(57) ABSTRACT

A method and mechanism for diagnosing application failures. An executable application is augmented with code which generates a list of components, as well as version information, utilized by the application. Also created is data which associates application components with applications which utilize those components. The list of components, version information, and association data are stored in a database and updated each time the application is run. In response to detecting a failure of the application, a database query is generated which returns a list of components utilized by the failed application. By comparing the date that application components changed to the date the application was last successfully run, a high priority list of components which changed since the last successful run may be generated. Diagnosis of the application failure may then begin with components in the high priority list.

22 Claims, 6 Drawing Sheets

APPLICATION FAILURE DIAGNOSIS

BACKGROUND OF THE INVENTION

1. Field of the Invention

The invention relates to computing systems and, more particularly, to the diagnosis of application failures.

2. Description of the Related Art

In recent years, computing technology has become ubiquitous and all manner of entities in society have become increasingly dependent upon the proper operation of both computer hardware and software. Accordingly, maintaining the proper operation and availability of the applications themselves is critically important. One common reason for application failure is due to a change in one or more of the components being used by the application. For example, updating or patching a particular resource or library used by an application may cause the application to fail. Alternatively, the path used by an application to access particular components may be changed, intentionally or unintentionally, which results in the use of a different version of a particular component or resource. While configuration tracking tools exist which may manage machine loadouts/application configuration files, such tools do not generally track what components are used by an application and how they change.

Given the increased dependence of corporate, government and other entities on the computer applications being used in their respective environments, it is critical that the cause of an application failure be quickly identified and remedied. However, diagnosing the cause of an application failure can be very difficult. One common and difficult to diagnose error is when an application that has previously worked reliably begins to fail. This is often caused by some change to the computer configuration. For example, various components of an operating system may be updated on a periodic basis. Subsequent to an update, various applications may be run without incident over a period of time. During this time other updates to the system may have occurred as well. At a later point in time, an application is run which is perhaps run on a less frequent basis and fails. The failure may be due to an update which occurred 3 weeks earlier. However, determining that the application failure is caused by a change to a particular component which occurred 4 updates earlier can be a daunting and time consuming task. Identifying the cause of the failure may be exacerbated because configuration management tools generally do not track which components are used by which applications. As another example, even if no software has been updated on the machine, many versions of a given software component may exist on the machine. Changes to application configuration, such as modifying the search path for libraries or for Java classes can have the unintended side-effect of changing what components are used by a given application, often leading to mysterious and difficult-to-diagnose failures.

Accordingly, an effective method and mechanism for diagnosing application failures is desired.

SUMMARY OF THE INVENTION

A method and mechanism are contemplated which facilitate diagnosing application failures.

In one embodiment, executable applications may be augmented with code which generates a list of components, as well as their version information, utilized by the application. Augmentation may be performed via injection, linking, or any other suitable method. In addition to the list and version information, data is created which associates the application components with those applications which utilize the components. The list of components, version information, and the association data are then stored in a database. Each time an application is run, corresponding data in the database is updated to reflect any changes in the components used by the application. A list of changed components can be detected by comparing component characteristics, such as modification dates or MD5 checksums from the application components to their corresponding values from when the application was last successfully run. Additionally configuration management tools may be queried to examine the modification history of given components. If a modification is detected, an event is sent to appropriate tracking tools, such as system logs, management consoles, or an additional database. In response to detecting a failure or changed behavior of an application, a computer operator can check the tracking tools (e.g., look in the system log management console, or the additional database), to get a list of components that have changed from prior runs of the application. The list of components which changed since the last successful run may then receive a higher priority during failure diagnosis than components which have not changed.

Also contemplated is a system administrator console which includes an application configured to support application failure diagnosis. In one embodiment, an administrator may utilize this application to select and configure client applications for monitoring. Client which have been selected for monitoring are augmented with new code to support the failure diagnosis method. The administrator console includes an interface which supports the generation of queries and the display of application and components related data. Data stored in the database may include key value pairs which associate an application and component. Queries using an application key may then be generated which return corresponding components. The returned data may then be sorted or filtered to highlight components of a given application which have changed since a last successful run of the application.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
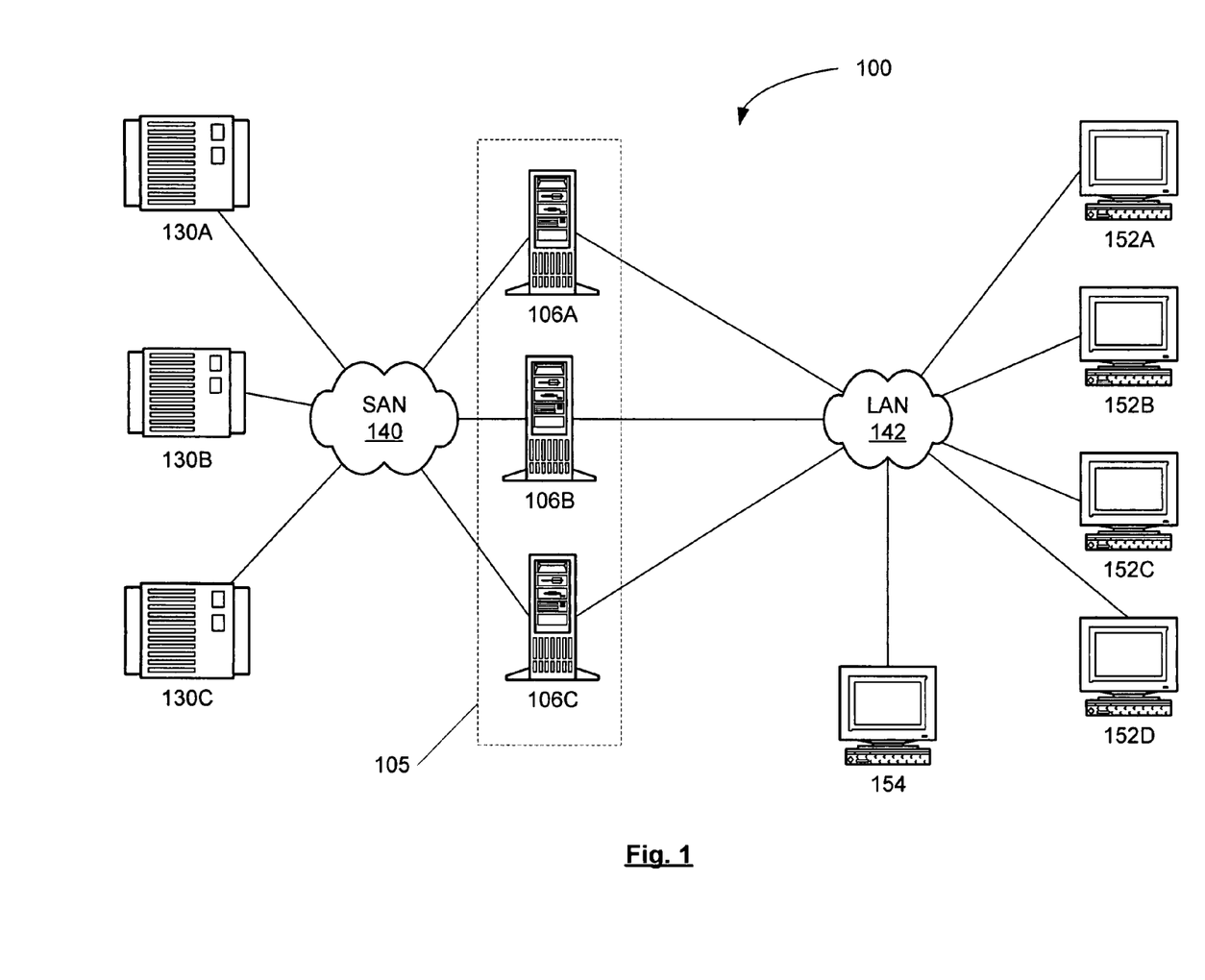
FIG. 1 illustrates one embodiment of a computer network.

FIG. 1 shows one possible embodiment of a computing network 100 which includes a computing cluster, SAN, and LAN. In the example shown, servers 106A-106C form a cluster 105. As used herein, elements referred to by a reference numeral followed by a letter may be collectively referred to by the numeral alone. For example, servers 106A-106C may be collectively referred to as servers 106. Together with data storage devices 130A-130C and SAN interconnect 140, servers 106 form a SAN. Servers 106 have direct access to any of the storage devices 130 which are connected to the SAN interconnect 140. SAN interconnect 140 is typically a high speed interconnect, such as Fibre Channel. In the SAN, no server is dedicated to a particular storage device as in a LAN. Any server 106 may access any storage device 130 on the storage area network. Also included in the network 100 of FIG. 1 are workstations 152 and LAN interconnect 142. As shown in FIG. 1, LAN 142 is coupled to cluster 105. Because each storage device 130 may be independently and directly accessed by any server 106, overall data throughput between the LAN and SAN may be much greater than that of the traditional client-server LAN. For example, if workstations 152A and 152C both submit access requests to storage device 130, two of servers 106 may service these requests concurrently. Alternatively, one of servers 106 may be configured as a failover server. In the event one of the servers 106 fails, another may become active in order to prevent service interruption or downtime.

In addition to workstations 152, FIG. 1 also depicts an administrator workstation 154 which may be used by a system administrator to configure and monitor operation of various hardware and software components in the computing network 100. In one embodiment, as discussed in more detail below, administrator workstation 154 is configured to monitor the status of applications executing on each of workstations 152, cluster 105, and elsewhere within the computing network 100. It is noted that the network depicted in FIG. 1 is intended to be exemplary only. Numerous other network configurations are possible and are contemplated.

Figure 2:
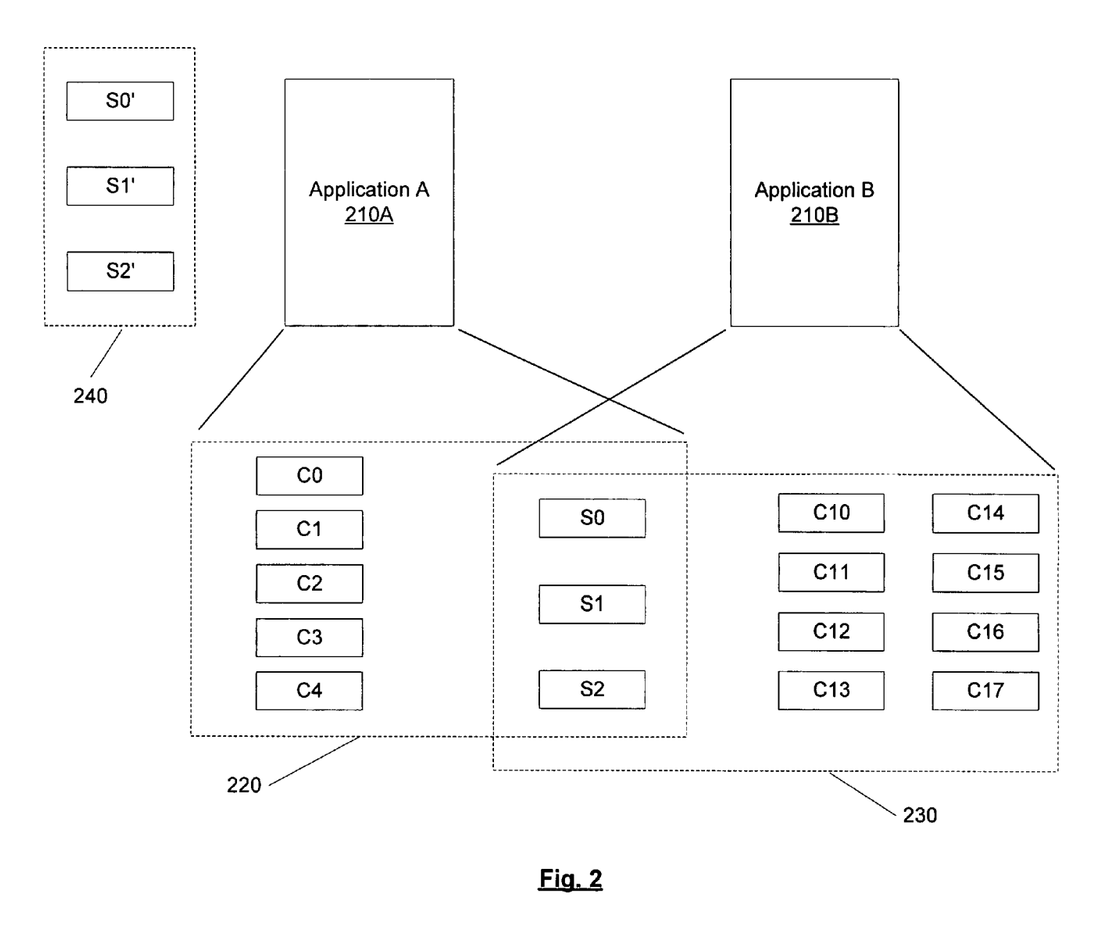
FIG. 2 illustrates applications and corresponding components.

FIG. 2 provides one example which illustrates two applications 210A-210B and a number of components used by each of the applications 210. Application A 210A is shown to include or utilize components C0-C4 and S0-S2, collectively illustrated by block 220. Application B 210B is shown to include or utilize components C10-C17 and S0-S2, collectively illustrated by block 230. Each of the components C0-C4, C10-C17 and S0-S2 may correspond to a library (e.g., DLL), a class (e.g., a JAVA® class), a driver, or any other suitable software component. Other examples of components include, executable programs, Active X controls, configuration files, virtual machines, a set of shared objects used by the application, and so on. As can be seen in FIG. 2, components S0-S2 are shared by both Application A 210A and Application B 210B. Also illustrated in FIG. 2 are components S0', S1', and S2' (block 240). Components S0', S1', and S2' generally correspond to components S0-S2, respectively, though some revisions may be present. For example, components 240 may represent older or newer versions of components S0-S2.

In one embodiment, components S0'-S2' are stored in a different file system location than components S0-S2. As may be appreciated, application environments are frequently configured to search for needed components in specific locations (e.g., as indicated by a LIBPATH, PATH, or other environment variable). In addition, the locations which are to be searched are generally searched in a particular order. In such a configuration, an application typically utilizes the first component located which is identified as being required by the application. It is noted that a particular component, or versions of a given component, may be stored in multiple locations. Given that the first such component found may be utilized by an application, any changes to the PATH environment variable (or any changes which otherwise affect the order and locations searched) can affect the application. Consequently, any change to the operating environment of an application may result in application failure due to the loading of an inappropriate or undesired component. However, because components required by the application are being loaded (i.e., no failed load attempts), identifying the cause of such a failure can be difficult and time consuming.

Another example of application failure results from the revision of a component which is appropriate for one application, but not another. For example, assume in FIG. 2 that Application B 210B is updated or enhanced in some way. For example, new features may have been added or some bug may have been fixed. The enhanced version of Application B 210B requires a new version of shared component S1. Component S1 may be provided by the same vendor that provides Application B 210B, or may be provided by another vendor (e.g., an operating system vendor). Therefore, shared component S1 is updated and Application B 210B is successfully run using the new component S1. Subsequently, Application A 210A is executed. It is noted that execution of Application A 210A may occur shortly after component S1 has been updated, or some time distant from the updating of S1.

During execution, Application A 210A experiences a failure. Upon review, it is noted that the vendor of Application A 210A has provided no updates for Application A 210A since the last successful execution of Application A 210. After further time and effort inquiring into the cause of the failure, it appears there has been no change in the operating environment (e.g., PATH, search locations, etc) of the application. Consequently, identifying the cause of the failure may take a relatively significant amount of time. It should be noted that even a short period of down time for many organizations can be quite costly. Therefore, diagnosing and correcting such failures as quickly as possible is of great importance. FIG. 2 is intended to be illustrative only. Numerous other configurations and causes of failure are possible and are contemplated.

Figure 3:
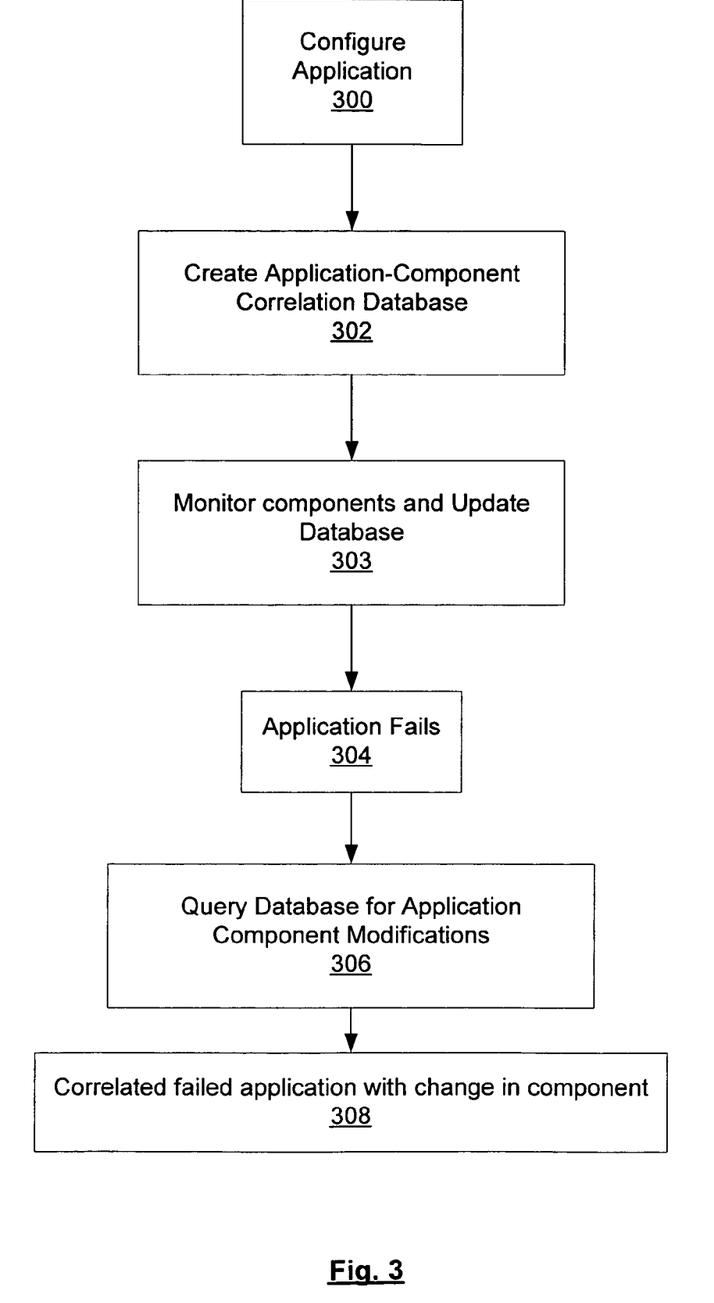
FIG. 3 illustrates an overview of a method for facilitating application failure diagnosis.

In order to facilitate diagnosing such failures, a system and method for monitoring components usage and correlating components with applications is discussed below. FIG. 3 provides an overview of a method for facilitating application failure diagnosis. First, an application is configured (block 300) to support the method and mechanism described herein. Generally speaking, the application may be augmented with new code. Augmentation may include injecting code, linking code, or any other suitable method of augmentation. Subsequently, the components which are utilized by the application are identified and stored in a database (block 302). The database which stores the component information is configured to support queries which correlate an application with its components, or a particular component with the applications which utilize the component.

Subsequent to configuration of the application and creation of the database, the various components utilized by the application are monitored for changes and any changes in components (e.g., due to a patch) are noted in the database (block 303). At some point in time the application may fail (block 304). Subsequent to the application failure, the database is queried (block 306) based upon the application which failed. For example, an entry corresponding to the failed application on an administrator console may be selected. Selection of the application entry may display information on the components which are used by the application. Included in the information may be an indication that a particular component used by the application has changed since the last successful run of the application (block 308). Accordingly, rapid diagnosis of the failure may be facilitated.

Figure 4:
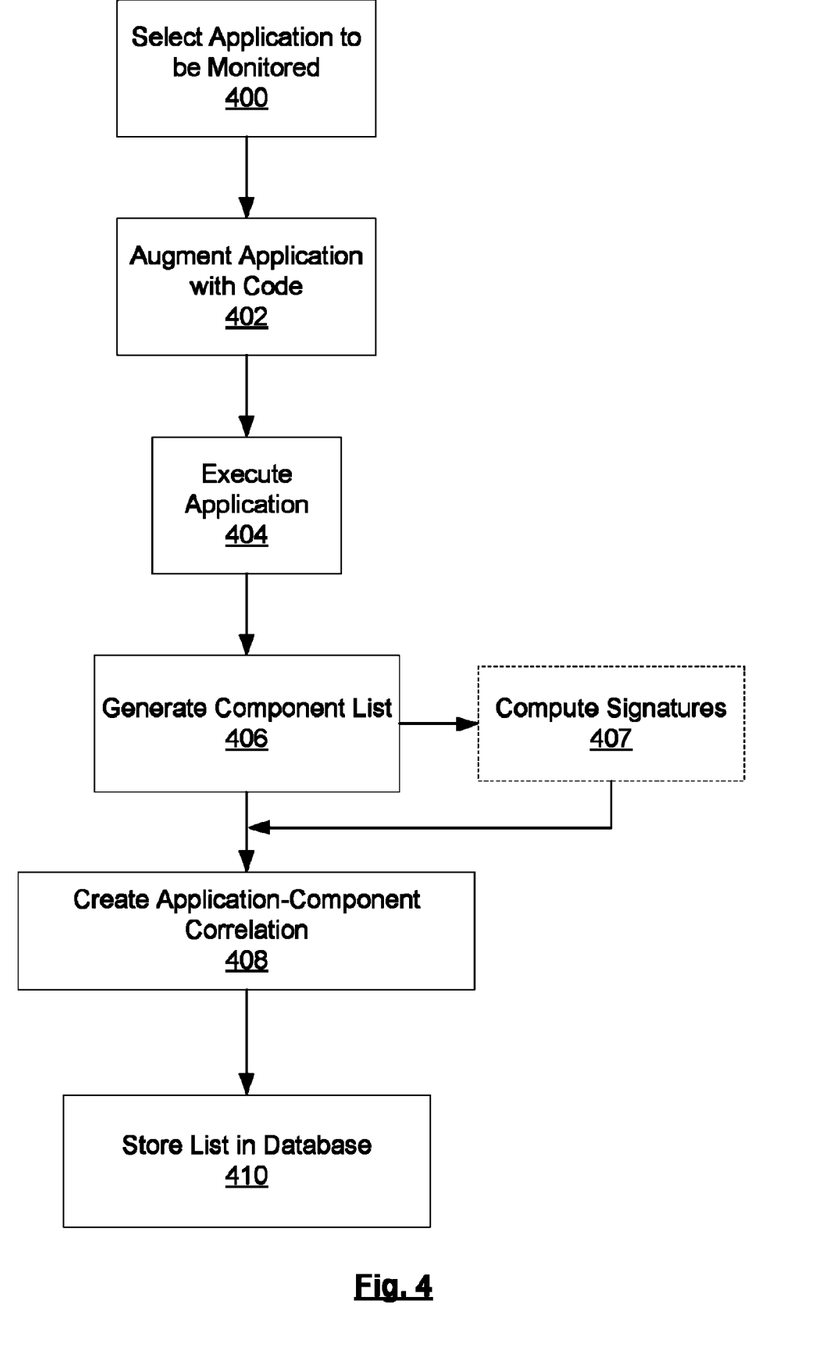
FIG. 4 illustrates one embodiment of a method for augmenting an application and generating application-component data.

Turning now to FIG. 4, one embodiment of the configuration of an application for monitoring is shown. Generally speaking, though not necessarily, a system administrator working from an administrator's console will configure the system as described. In one embodiment, the administrator installs application code to support monitoring and database functions on an administrator's workstation. In addition, supporting code is installed on user workstations or servers ("clients") which include applications to be monitored. After the administrator's workstation is configured, an application which is to be monitored is identified and selected (block 400). The application, and/or the workstation on which the application is located, is then augmented with code to support the monitoring functions (block 402).

As described above, there are a number of ways in which the application code on a client may be augmented with supporting code. For example, the supporting code may be injected into the existing application using the registry, hooks, or remote threads. In this manner, the new code can be run within the address space of the existing application code. In one embodiment, the new code may reside in a DLL. Alternatively, the new code may be linked into the existing application code. Those skilled in the art will appreciate there are a variety of ways to augment existing application code.

Subsequent to augmenting the application code on the client machine, the application may be executed (block 404) and a list of the components used by the application generated (block 406). Many programming languages today include methods which return information on components used by the application. In addition, application programming interfaces (APIs) are typically provided for accessing these and other methods. In one embodiment, the new code which has been injected into, linked, or otherwise added to the original application code makes use of these existing methods and APIs to generate a list (block 406) of components used by the application. Subsequent to generating the component list, an association with the application is created (block 408) for each of the components. For example, in one embodiment, key value pairs may be created such as <application><component>. These pairs (or some similar data) may then be written to a database (block 410) for use in tracking changes to applications and their components. Subsequently, a query including an <application> key may be used to identify all components which correspond to the application. Of course there are a number of ways in which a component may be associated with an application, and vice-versa. All such alternatives are contemplated.

While in the example of FIG. 4 the application is executed (block 404) immediately after its code has been augmented, this need not be the case. Execution of the application, generation of the component list, and so on, may occur at a later time. However, in one embodiment, such execution (block 404) and list generation (block 406) is done at the time of client configuration.

In addition to storing information which associates/correlates components and applications, additional information may be stored. For example, as will be illustrated below, data may be stored which indicates the current version and date of creation of each component, the previous version and date of each component (if any), the last time the application was executed, the date the application was last changed, and so on. Depending upon the particular implementation, this and other information may be included in the database. Also depicted in FIG. 4 is the optional computation of signatures (block 407) for each of the identified components. While methods for identifying the version information for each component may be present, in some cases it may be desirable to store a signature in addition to, or in lieu of the returned version information.

In one embodiment, a signature generating algorithm such as an MD5 algorithm may be utilized to compute a signature for each of the components. Generally, MD5 is an algorithm that takes as input a message (data) of arbitrary length and produces as output a 128-bit "fingerprint", or signature, of the input. When the data is later accessed, the signature is recomputed and compared to the previously computed signature. If the two signatures do not match, it may be assumed that the data has been corrupted or changed in some way.

In the context of the above described system, rather than relying solely on version information which may be contained within a component, signatures such as that described above may be used to determine whether an application component has changed. For example, the list that is stored in the database (block 410) may have an associated signature which is generated at the time the list is created or updated. Subsequently, when the application is run, the signature may be recomputed and compared to the signature indicated by the stored list. If the original and newly computed signatures are not identical, it may be assumed that the component has changed.

While using sophisticated algorithms such as MD5 may be desirable in certain cases, computing such signatures may require a relatively large amount of processing and IO resources. Consequently, rather than generating signatures in every case, signature generation and usage may be utilized on a more selective basis as deemed appropriate for a given system and/or application.

Figure 5:
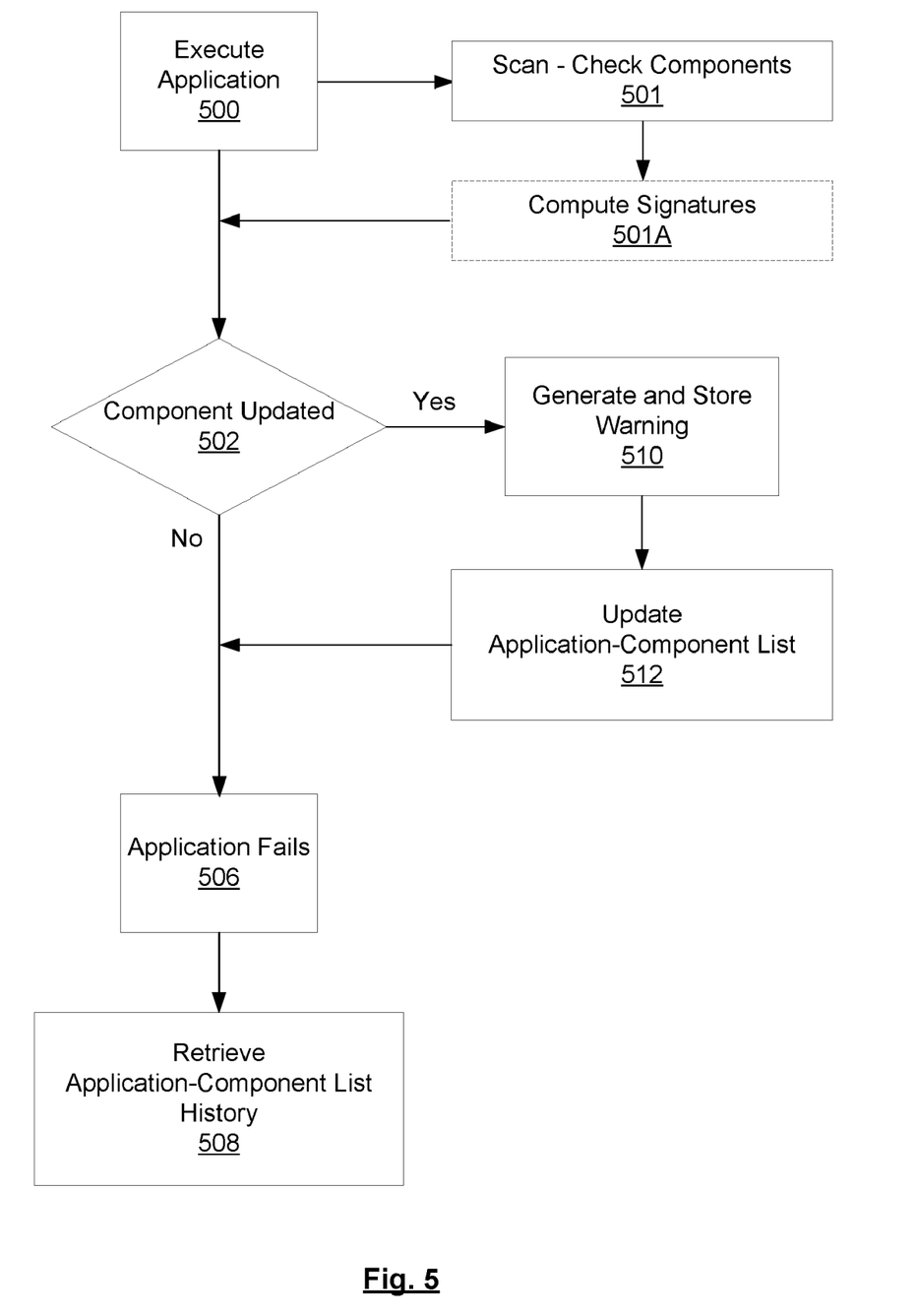
FIG. 5 illustrates one embodiment of a method for diagnosing an application failure.

FIG. 5 illustrates one embodiment of a sequence of events wherein an application is executed and subsequently fails. In the example of FIG. 5, it is assumed that the application being executed has already been configured for monitoring as described in FIG. 4. As show shown, at some point in time, an application configured for monitoring is executed (block 500). Execution of the application may then initiate a scan (block 501) of the components used by the executed application. This scan may, for example, be initiated in response to code which has been injected or linked into the executing application. In addition to identifying the components used by the application, pertinent version information for each of the components may also be obtained. In addition, new signatures for the components may optionally be computed (block 501A). The retrieved component and version information may then be conveyed, or otherwise made available, to the corresponding application monitoring application which has been installed on an administrator workstation.

Subsequent to generating the component and version information (block 501, block 501A), a comparison may be made with the component and version information for the application which was previously stored in the database (block 502). If the comparison indicates a component has changed, a warning may be generated and stored in the database, a log file, or both (block 510). In addition, the application-component data stored in the database is updated (block 512) to reflect any component and/or version changes. Block 506 then indicates that the application fails in some manner. In response to detecting the failure, a system administrator may then utilize the application monitoring application to retrieve component and version data from the database (block 508). In one embodiment, all components which correspond to the failed application may be readily identified through the database. Any changes in components used by the application since the last application run may also be readily identified by the recorded version history stored in the database. In this manner, any changes which may have caused the application failure may be quickly diagnosed and remedied as appropriate.

Figure 6:
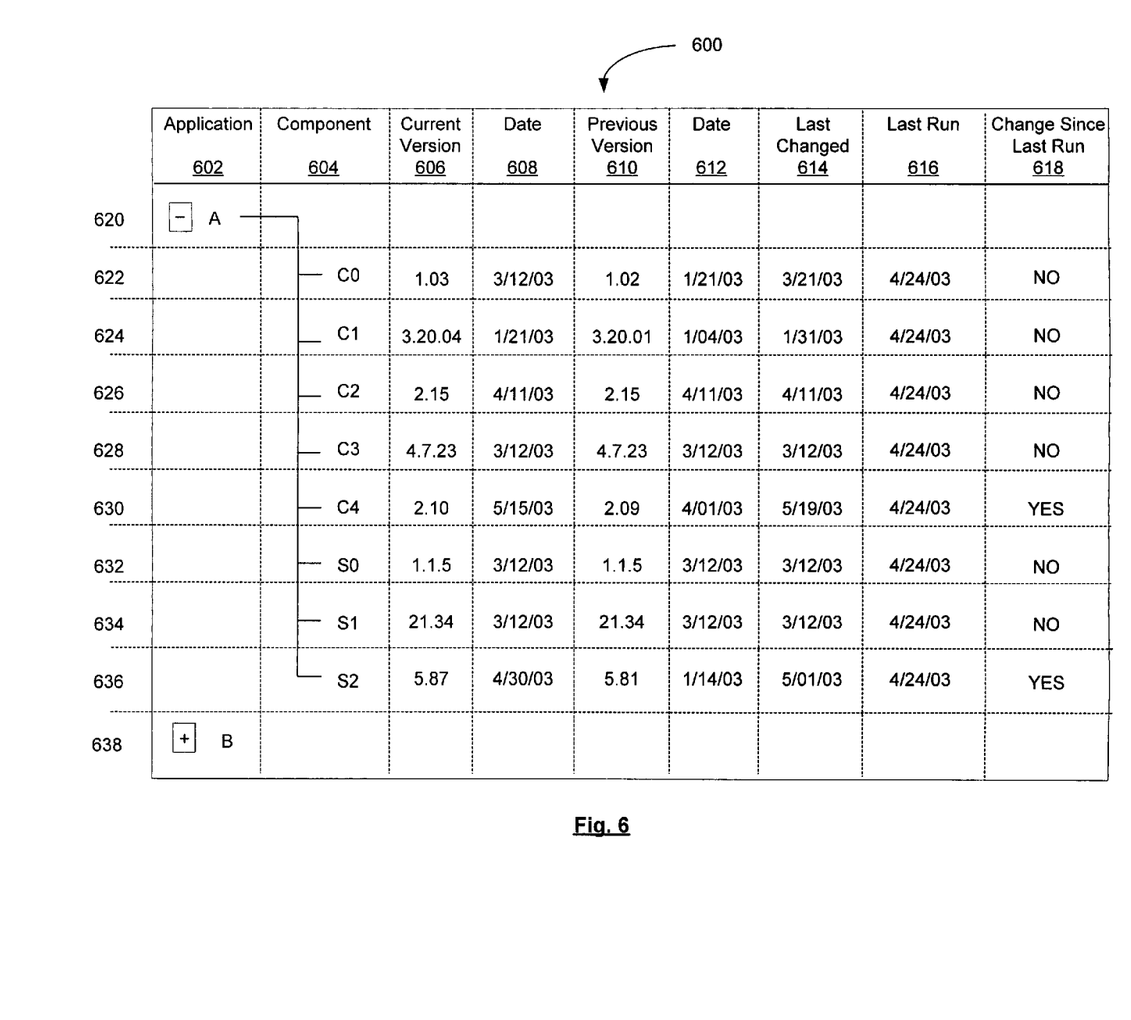
FIG. 6 illustrates one embodiment of data displayed by an administrator's console.

One example of the information which may be provided by accessing the database is illustrated in FIG. 6. In one embodiment, the data illustrated by FIG. 6 may be provided via a GUI interface. It will be appreciated that numerous alternatives to providing and displaying the requested data are possible and are contemplated. In the example shown, a table 600 is depicted which shows applications, the components corresponding to those applications, and version related information for use in diagnosing application failures. Table 600 includes the following columns: Application 602 which identifies a particular application to be examined; Component 604 which identifies components corresponding to a particular application; Current Version 606 which indicates the current version of the component; Data 608 which indicates the date of creation for the Current Version 606; Previous Version 610 and Date 612 indicate the previous version and creation date of the component; Last Changed 614 which indicates the date the corresponding component was changed or updated from the perspective of the application (e.g., the actual date a patch was applied for the application); Last Run 616 which indicates the date the application was last run; and Change Since Last Run 618 which indicates whether or not the component has changed since the application last run.

Each of the rows in table 600 correspond to an application or component. In the example shown, two applications are shown—application A in row 620 and application B in row 638. In the example, selecting a particular application may alternately expand or contract in a tree like structure the components corresponding to the application. For example, application A in row 620 is shown to be in an expanded state. Row 638 depicts Application B which is in a non-expanded state. Expanding an application entry displays components utilized by the corresponding application. In the embodiment shown, rows 622, 624, 626, 628, 630, 632, 634, and 636 include information on components utilized by Application A 620.

Row 622 identifies one component, component C0, which is utilized by Application A. In the example shown, the current version of component C is 1.03. Generally speaking, the current version of a component corresponds to the version of the component which was identified the last time the application was run. The date the current version of the component was created is indicated by column 608, which in this example is Mar. 12, 2003. The previous version of component C0 was 1.02 which was created Jan. 21, 2003. The date that the application was actually updated to the current version of the component was Mar. 21, 2003. Finally, the date the application was last successful run is indicated to be Apr. 24, 2003. Based upon the information included in row 622, a determination may be made as to whether or not the component has changed since the last time the application was run. With respect to component C0, the last successful run with the component C0 was Apr. 24, 2003. However, the last change to component C0 occurred Mar. 21, 2003. Therefore, column 618 indicates ("NO") the component has not changed since the last successful run.

On the other hand, component C4 in row 630 indicates ("YES") the component has changed since the last successful run of the application. In this case, the last successful run of the application occurred on Apr. 24, 2003. However, component C4 was Last Changed 614 on May 19, 2003. Given this information, a system administrator may choose to investigate whether or not the change to component C4 is the cause of a current application failure. In the example shown, component S2 is also shown to have changed since the last successful run of the application.

Generally speaking, each application may have or utilize many more components than are shown in the example of FIG. 6. Consequently, merely examining each of the components in an arbitrary sequence may prove very time consuming and inefficient. By generating information such as that depicted in FIG. 6, and indicating those components which have changed since the last successful run of the application, a more efficient approach to investigating an application failure may be utilized. In this case, components which have changed since the last successful run of the application will receive a higher priority for purposes of investigation than those which have not changed since the last successful run. In various embodiments, the interface developed to display the information may allow sorting the column 618 to move all entries which have changed since the last successful run to the top. Alternatively, the interface may allow filtering to only display those which have changed. Numerous such alternatives are possible and are contemplated.

While the assumption may ultimately prove to be incorrect that the cause of a failure is due to a changed component, those skilled in the art will appreciate that such changes are often the cause of such failures and the likelihood is greater that a changed component caused the failure rather than a non-changed component. Therefore, by focusing on the changed components first, a correct diagnosis of the failure is likely to be achieved more quickly.

It is noted that the above described embodiments may comprise software. In such an embodiment, the program instructions which implement the methods and/or mechanisms may be conveyed or stored on a computer accessible medium. Numerous types of storage media which are configured to store program instructions are available and include hard disks, floppy disks, CD-ROM, DVD, flash memory, Programmable ROMs (PROM), random access memory (RAM), and various other forms of volatile or non-volatile storage. Still other forms of non-storage type media which are configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

What is claimed is:

1. A method for diagnosing application failures, said method comprising:

initiating execution of an application which utilizes a plurality of components; in response to detecting said execution:

generating a list of components utilized by said application, said list including version information corresponding to each component of said components, wherein said components are software components including one or more of library, a class, a driver or any other software component;

computing first signatures for each of one or more of said components using a signature generating algorithm, wherein said algorithm computes a unique signature for a given component based on a contents of the given component;

generating association data which associates said components with said application; and storing said list, said signatures, and said association data in a database; re-executing said application;

computing second signatures for each of one or more components of the re-executed application using said algorithm;

updating said database to reflect changes to one or more of said components used by the application; and investigating a change in behavior of the application, wherein said investigating comprises:

querying said database; and identifying component changes since a previous run of the application, wherein changes to one or more of said components are detected by determining a first signature of a corresponding component does not match a second signature of a corresponding component.

2. The method as recited in claim 1, wherein said database further comprises data identifying a configuration of components which correspond to a successful run of the application.

3. The method as recited in claim 2, wherein said updating comprises storing data which identifies a new version of said one or more components and data which indicates when said updating is performed.

4. The method as recited in claim 3, wherein said identifying comprises comparing said new version of said one or more components to the date of the last successful run of the application.

5. The method as recited in claim 4, wherein the association data comprises key value pairs including an application key and a component key, and wherein said querying comprises generating a query with an application key and retrieving corresponding component key data.

6. The method as recited in claim 5, further comprises augmenting said application code with code which generates said list of components.

7. The method as recited in claim 6, wherein said augmenting comprises adding new code to said application by either injecting said new code or linking said new code.

8. The method as recited in claim 1, wherein said component changes correspond to a change selected from the group consisting of: a component used by the application has never been used by the application in any preceding runs; a component used by the application was not used in the immediately preceding run of the application; and the last time the application used a particular component, the particular component had a different version.

9. The method as recited in claim 1, wherein said updating further comprises storing a warning in the database in response to detecting a component used by the application has changed.

10. A computing system comprising:
a database configured to store data;
a first computer comprising an executable application, said application being augmented with new code, wherein in response to detecting execution of said application, the application is configured to:

generate a list of components utilized by the application, said list including version information corresponding to each component of said components; wherein said components are software components including one or more of library, a class, a driver or any other software component;

compute first signatures for each of one or more of said components using a signature generating algorithm, wherein said algorithm computes a unique signature for a given component based on a contents of the given component; and generate association data which associates said components with said application; and a second computer configured to:

in response to detecting execution of said application, store said list, said signatures, and said association data in the database;

in response to detecting re-execution of said application, compute second signatures for each of one or more components of the re-executed application using said algorithm, and update said database to reflect changes to one or more of said components used by the application;

support investigation of a change in behavior of the application, wherein said investigation comprises:

querying said database; and identifying component changes since a last successful run of the application, wherein changes to one or more of said components are detected by determining a first signature of a corresponding component does not match a second signature of a corresponding component.

11. The computing system as recited in claim 10, wherein said second computer is further configured to store data which identifies a configuration of components which correspond to a successful run of the application.

12. The computing system as recited in claim 11, wherein said second computer is configured to compare a new version of said one or more components to the date of the last successful run of the application in order to identify said changes.

13. The computing system as recited in claim 12, wherein the association data comprises key value pairs including an application key and a component key, and wherein said query comprises generating a query with an application key to retrieve corresponding component key data.

14. The computing system as recited in claim 13, wherein said application code is augmented with new code by either injecting said new code or linking said new code.

15. The computing system as recited in claim 10, wherein said component changes correspond to a change selected from the group consisting of: a component used by the application has never been used by the application in any preceding runs; a component used by the application was not used in the immediately preceding run of the application; and the last time the application used a particular component, the particular component had a different version.

16. A computer readable storage medium comprising program instructions executable to:

detect execution of an application which utilizes a plurality of components;

generate a list of components utilized by said application, said list including version information corresponding to each component of said components, wherein said components are software components including one or more of library, a class, a driver or any other software component;

compute first signatures for each of one or more of said components using a signature generating algorithm, wherein said algorithm computes a unique signature for a given component based on a contents of the given component;

generate association data which associates said components with said application; store said list, said signatures, and said association data in a database; detect re-execution of said application; compute second signatures for each of one or more components of the re-executed application using said algorithm;

update said database to reflect changes to one or more of said components used by the application;

investigate a change in behavior of the application, wherein investigating said change comprises:

querying said database; and identifying component changes since a last successful run of the application, wherein changes to one or more of said components are detected by determining a first signature of a corresponding component does not match a second signature of a corresponding component.

17. The computer readable storage medium as recited in claim 16, wherein said program instructions are further executable to store data which identifies a new version of said one or more components and data which indicates when said updating is performed.

18. The computer readable storage medium as recited in claim 17, wherein said program instructions are executable to identify said changes by comparing said new version of said one or more components to the date of the last successful run of the application.

19. The computer readable storage medium as recited in claim 18, wherein the program instructions are executable to generate association data by generating key value pairs including an application key and a component key, and wherein generating said query comprises generating a query with an application key and retrieving corresponding component key data.

20. The computer readable storage medium as recited in claim 19, wherein said program instructions which generate said list of components comprises new code which has been added to an existing application.

21. The computer readable storage medium as recited in claim 20, wherein said new code is added by either injecting said new code or linking said new code.

22. The computer readable storage medium as recited in claim 16, wherein said component changes correspond to a change selected from the group consisting of: a component used by the application has never been used by the application in any preceding runs; a component used by the application was not used in the immediately preceding run of the application; and the last time the application used a particular component, the particular component had a different version.

* * * * *